US012580849B2

(12) United States Patent
Vasseur et al.

(10) Patent No.: US 12,580,849 B2
(45) Date of Patent: Mar. 17, 2026

(54) PRIVATE SD-WAN PEERING

(71) Applicant: Cisco Technology, Inc., San Jose, CA (US)

(72) Inventors: Jean-Philippe Vasseur, Combloux (FR); Grégory Mermoud, Venthône (CH); Pierre-André Savalle, Rueil-Malmaison (FR); Eduard Schornig, Haarlem (NL); Michal Wladyslaw Garcarz, Cracow (PL)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 18/199,509

(22) Filed: May 19, 2023

(65) Prior Publication Data

US 2024/0388526 A1     Nov. 21, 2024

(51) Int. Cl.
*H04L 45/302* (2022.01)
*H04L 45/02* (2022.01)
*H04L 45/76* (2022.01)

(52) U.S. Cl.
CPC ............ *H04L 45/302* (2013.01); *H04L 45/04* (2013.01); *H04L 45/76* (2022.05)

(58) Field of Classification Search
None
See application file for complete search history.

(56) References Cited

U.S. PATENT DOCUMENTS

| | | | |
|---|---|---|---|
| 10,951,490 B2 | 3/2021 | Kumaran et al. | |
| 11,336,482 B2 | 5/2022 | Ramamoorthi et al. | |
| 11,595,231 B2 | 2/2023 | Vuggrala et al. | |
| 2015/0156079 A1* | 6/2015 | Satterlee ............ | H04L 41/0894 |
| | | | 709/223 |
| 2015/0381493 A1* | 12/2015 | Bansal ................. | H04L 45/745 |
| | | | 370/392 |
| 2018/0026933 A1* | 1/2018 | Asati ...................... | H04L 45/12 |
| | | | 709/223 |
| 2019/0081889 A1* | 3/2019 | Fieau ................... | H04L 65/1069 |
| 2019/0109781 A1* | 4/2019 | Fan .......................... | H04L 12/66 |
| 2020/0274738 A1* | 8/2020 | Gu ....................... | H04L 12/4633 |
| 2020/0336420 A1* | 10/2020 | Joshi ................... | G06F 9/45558 |
| 2022/0038347 A1 | 2/2022 | Vasseur et al. | |
| 2022/0141190 A1* | 5/2022 | Olson .................... | H04L 45/22 |
| | | | 726/15 |
| 2023/0059537 A1 | 2/2023 | Gavand et al. | |
| 2023/0421252 A1* | 12/2023 | Akyildiz ............ | H04B 7/18521 |
| 2024/0333647 A1* | 10/2024 | Tseng ..................... | H04L 45/64 |

* cited by examiner

*Primary Examiner* — Xavier S Wong
(74) *Attorney, Agent, or Firm* — Lee & Hayes, P.C.

(57)          ABSTRACT

In one embodiment, a device identifies available resources of a tunnel in a first software defined network. The device provides, based on the available resources, an indication that the tunnel is available to convey traffic sent by a second software defined network. The device receives, based on the indication, a request to convey traffic sent by the second software defined network via the tunnel in the first software defined network. The device configures a peering node in the first software defined network to connect the second software defined network to the tunnel to allow the traffic sent by the second software defined network to be conveyed via the tunnel.

20 Claims, 11 Drawing Sheets

ROUTERS 606

—— INTERNET

- - - - MPLS

SaaS PROVIDER
308

ISP 3
306d

ISP 2
306b

ISP 1
306a

MPLS
306c

REGIONAL
HUB
304

Int 1

Int 2

Int 3

110

REMOTE
SITE
302

310

400

SDN CONTROLLER
408

SD-WAN
FABRIC
404

110b

110a

SD-WAN
SERVICE POINT
406

LAN CORE
402

DEVICE CLASSIFICATION PROCESS 248

TUNNEL
RESOURCE
MANAGER
502

TUNNEL
INVENTORY
504

TUNNEL
BROKER
ENGINE
506

POLICY
ENGINE
508

TRAFFIC
MONITOR
510

500

800

805

START

810

IDENTIFY AVAILABLE RESOURCES OF
TUNNEL IN FIRST NETWORK

815

PROVIDE INDICATION THAT TUNNEL IS AVAILABLE

820

RECEIVE REQUEST TO CONVEY TRAFFIC VIA TUNNEL

825

CONFIGURE PEERING NODE

830

END

PRIVATE SD-WAN PEERING

TECHNICAL FIELD

The present disclosure relates generally to computer networks, and, more particularly, to private software defined wide area network (SD-WAN) peering.

BACKGROUND

For decades, computer networks have used Key Performance Indicator (KPIs) such as delay, loss, and jitter as proxies for the true user experience of online applications. More specifically, network administrators typically set different Service Level Agreements (SLAs) for different applications, under the assumption that there are certain KPI thresholds at which the user experience of an application becomes degraded. For instance, a voice application may be considered to give poor user experience when it violates an SLA such as: latency >300 ms or loss >3% or jitter >50 ms.

In the case of software defined wide area networks (SD-WANs), many companies today configure tunnels offering SLA guarantees over the Internet, Multiprotocol Label Switching (MPLS), etc. However, since the setup of such tunnels is not dynamic, these tunnels are often unused and testing has revealed that many such tunnels are not carrying any traffic, most of the time.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
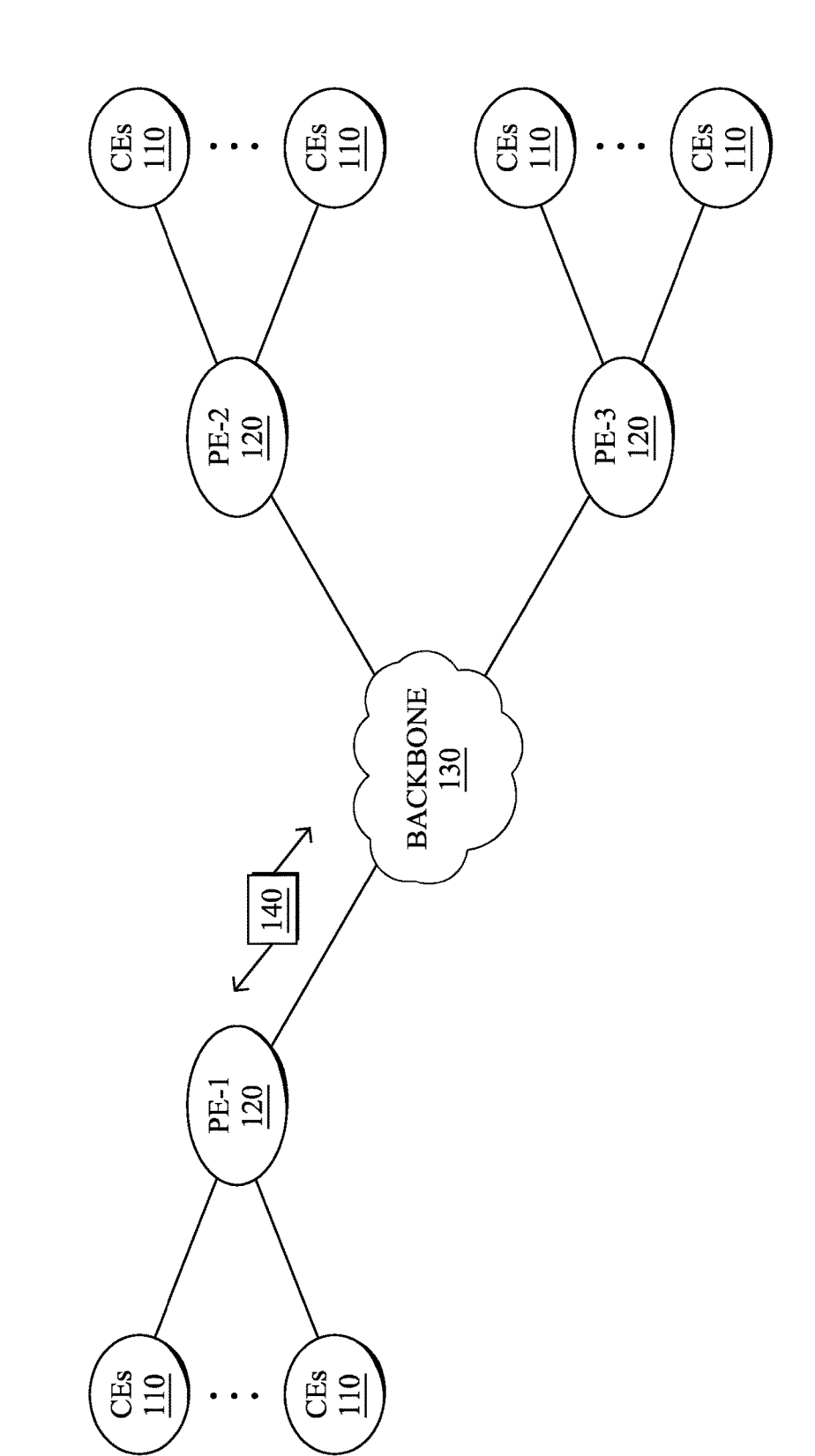
FIGS. 1A-1B illustrate an example communication network.

According to one or more embodiments of the disclosure, a device identifies available resources of a tunnel in a first software defined network. The device provides, based on the available resources, an indication that the tunnel is available to convey traffic sent by a second software defined network. The device receives, based on the indication, a request to convey traffic sent by the second software defined network via the tunnel in the first software defined network. The device configures a peering node in the first software defined network to connect the second software defined network to the tunnel to allow the traffic sent by the second software defined network to be conveyed via the tunnel.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
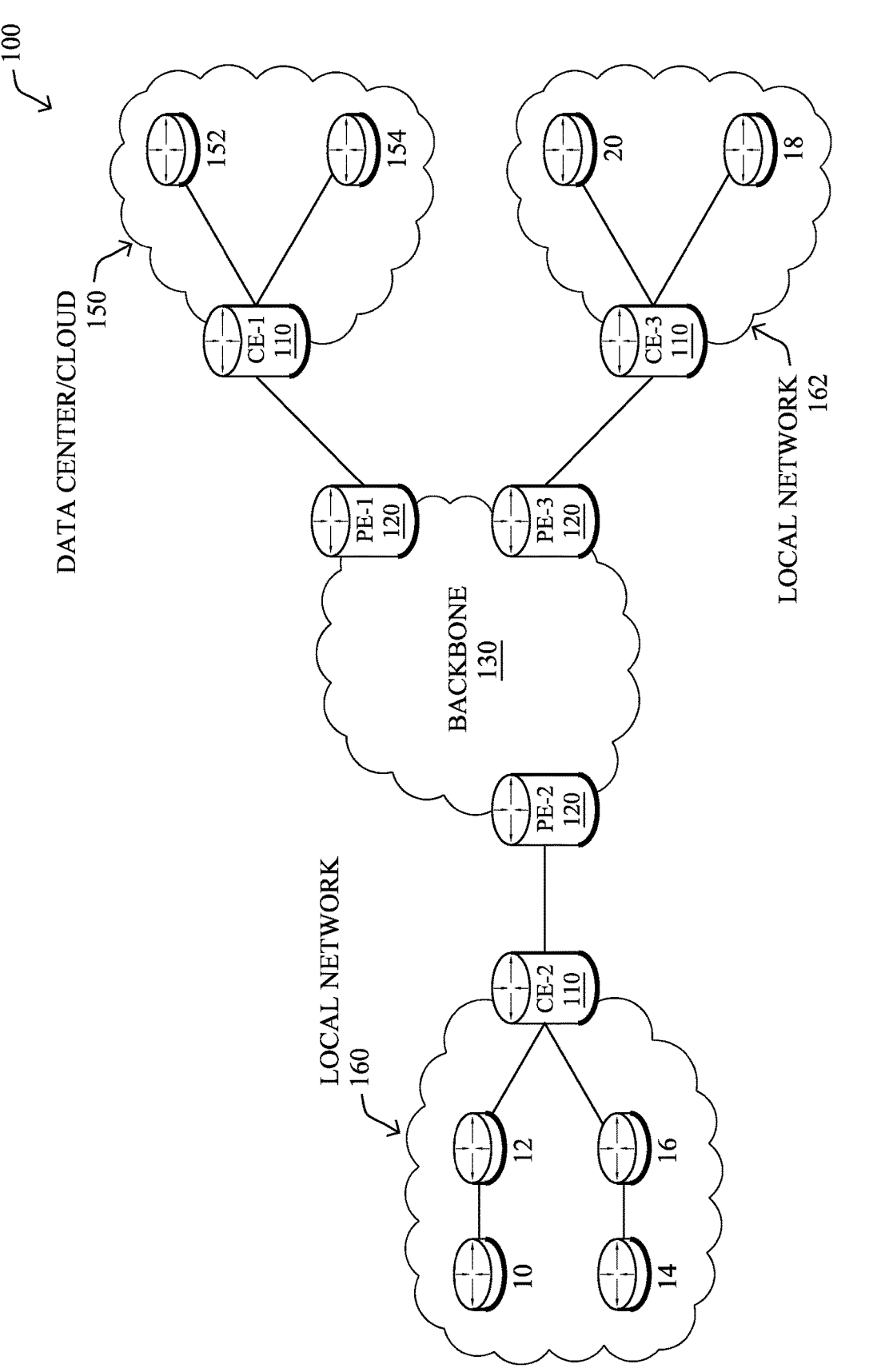

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
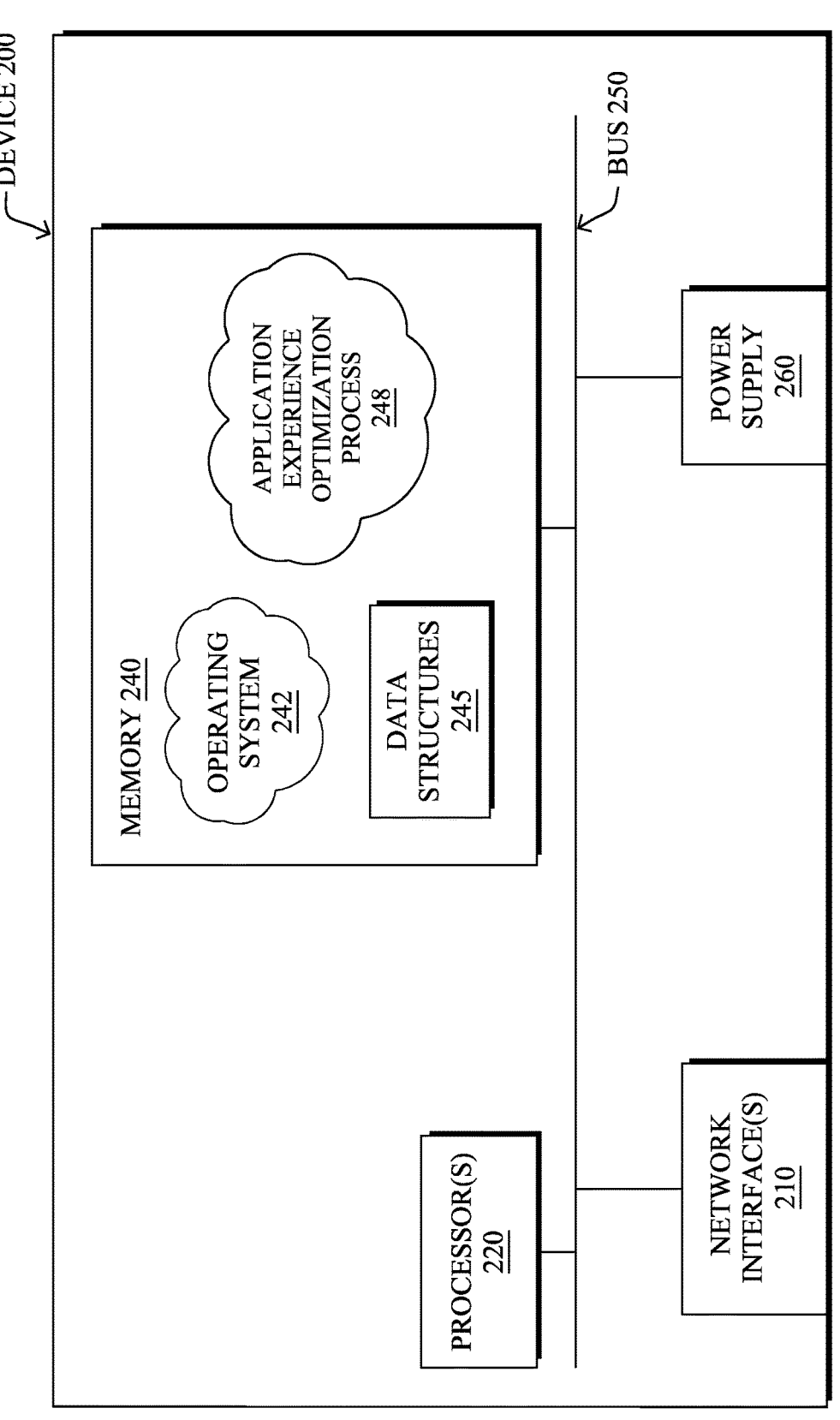
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an application experience optimization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, application experience optimization process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, application experience optimization process 248 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, application experience optimization process 248 may include computer executable instructions that, when executed by processor(s) 220, cause device 200 to perform the techniques described herein. To do so, in some embodiments, application experience optimization process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, application experience optimization process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application experience optimization process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
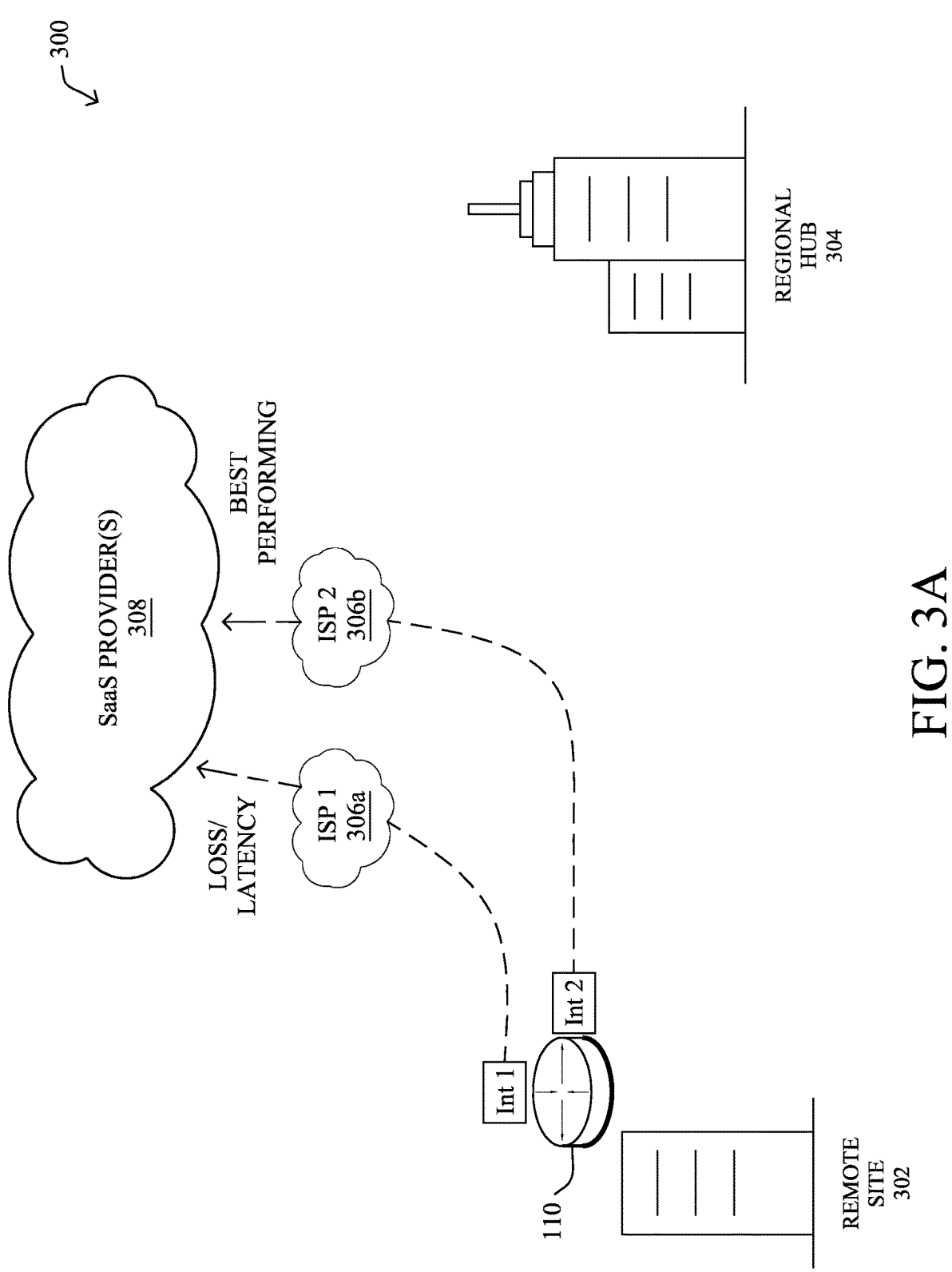
FIGS. 3A-3B illustrate example network deployments.
Figure 3B:

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
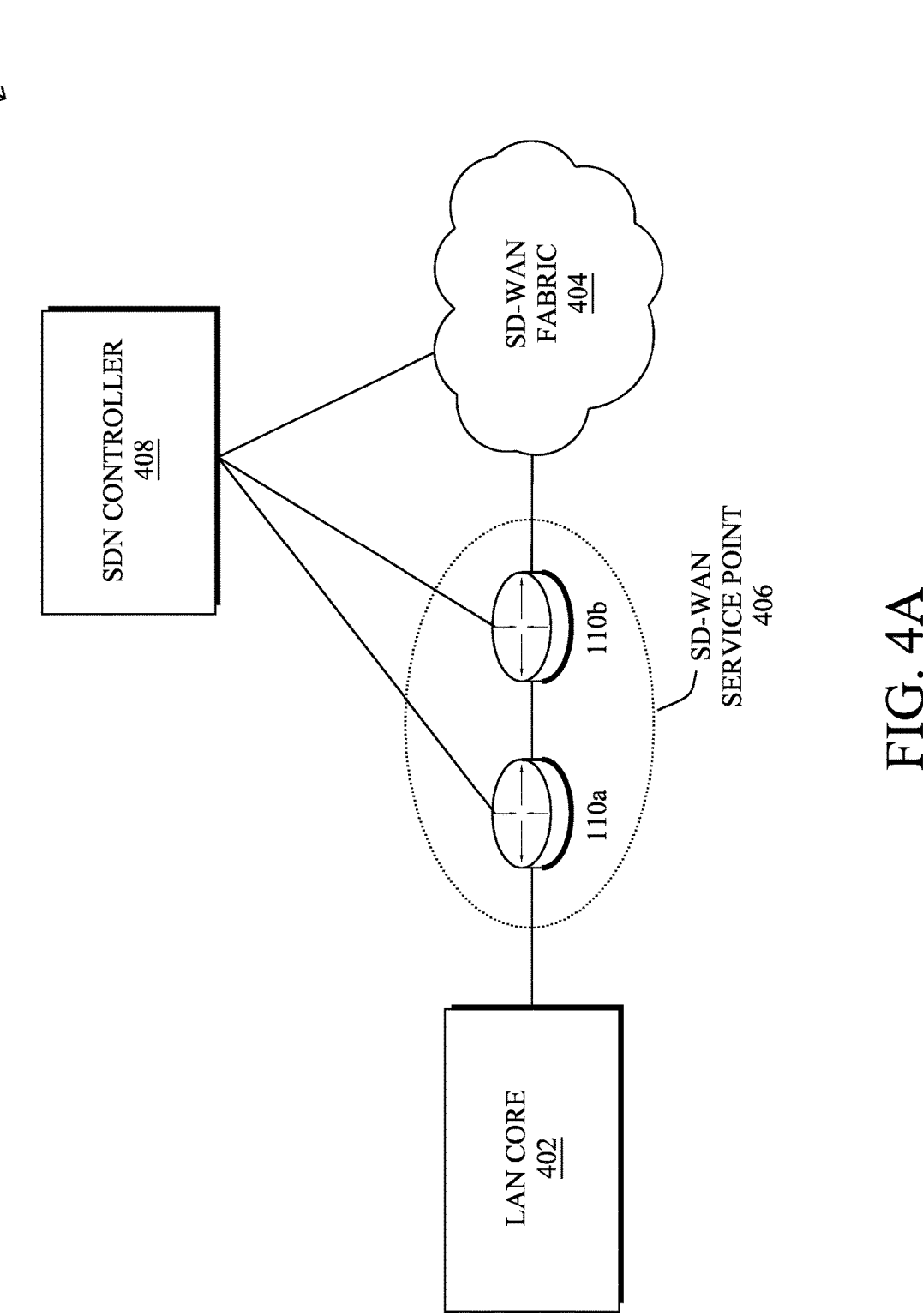
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance. SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers:

Internet, MPLS. LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS. OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed.' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
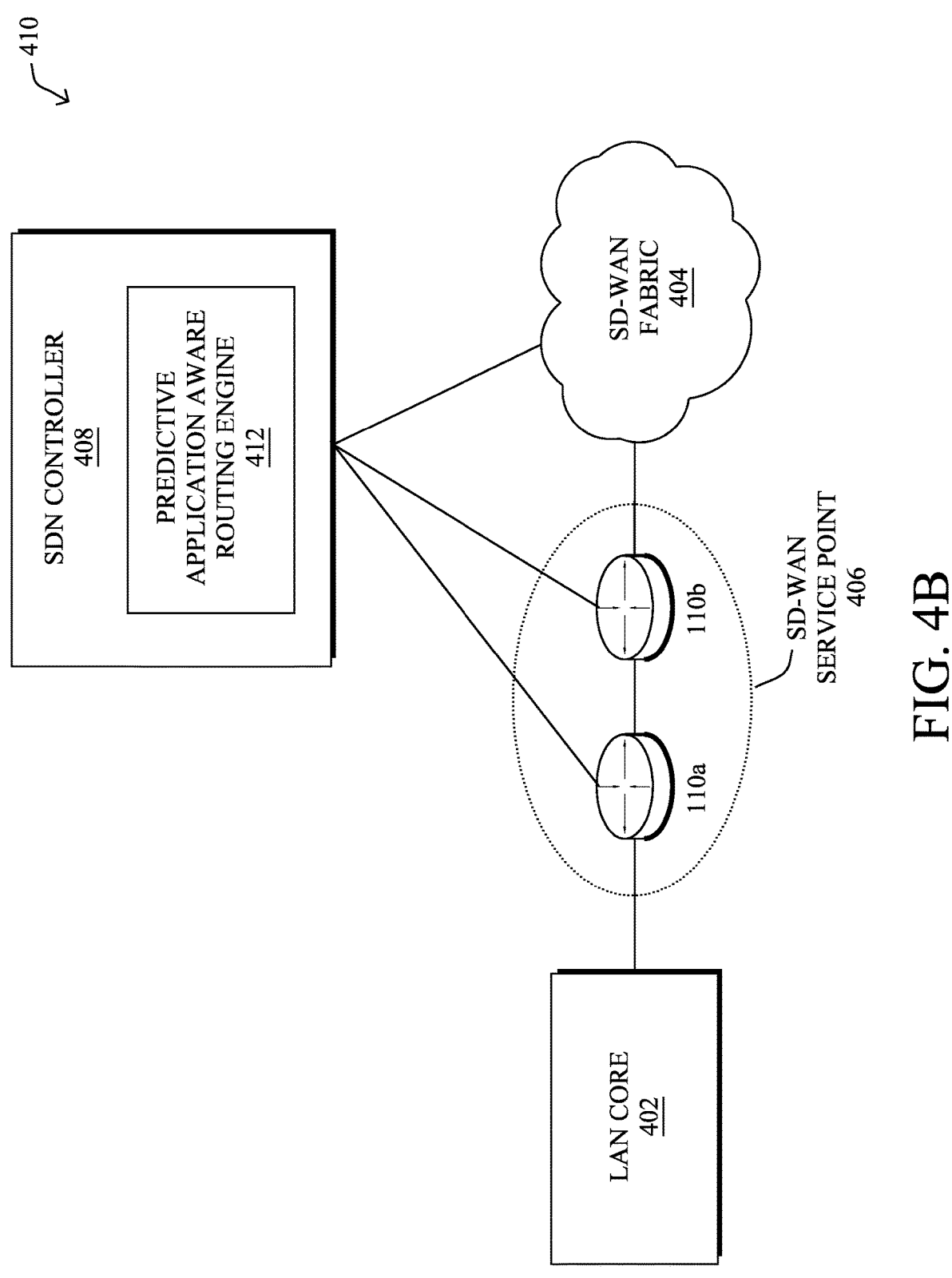

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of application experience optimization process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In other words, predictive application aware routing engine 412 may use SLA violations as a proxy for actual QoE information (e.g., ratings by users of an online application regarding their perception of the application), unless such QoE information is available from the provider of the online application. In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, enterprise networks have undergone a fundamental transformation whereby users and applications have become increasingly distributed whereby technologies such as SD-WAN. Hybrid Work, and Zero Trust Network Access (ZTNA) have enabled unprecedented flexibility in terms of network architecture and underlay connectivity options. At the same time, collaboration applications, which are often critical for day-to-day business operations, have moved from on-premises deployment to a SaaS cloud delivery model that allows application vendors to rapidly deploy and take advantage of the latest and greatest codecs that can be used to increase robustness of media content.

In this highly dynamic environment, the ability of network administrators to understand the impact of network performance (or lack of) on the QoE of online applications, as well as ensuring that the proper SLAs are satisfied, is becoming increasingly challenging. Indeed, in years past, network metrics were used as a proxy for the true application QoE, with SLAs being set, accordingly. For instance, in the case of a voice application, the usual SLA boundaries are 150 ms for delay, 50 ms for jitter, and maximum of 3% packet loss. Today, such values are not as clear-cut. For example, two real-time voice calls may have different loss thresholds based on the audio codec being used whereby a voice application that uses a lossy codec such as Opus may be resistant until a packet loss of up to 30%, whereas other audio codecs, such as advanced audio coding (AAC), are usually not resilient to such high loss thresholds.

Another factor that demonstrates the shortfalls of relying on SLA thresholds as a proxy for the true application QoE is that SLAs are set without any consideration to the granularity of their underlying measurements. For instance, a path experiencing a constant delay of 120 ms for voice over a period of 10 minutes provides a very different user experience than a path with the same average delay that keeps varying between 20 and 450 ms, despite averaging out to the same over the time period. The dynamics of such metrics is even more critical for packet loss and jitter in the case of voice and video traffic (e.g. ten seconds of 80% packet loss would severely impact the user experience although averaged out over ten minutes would give a low value totally acceptable according to the threshold). Without a doubt, the user experience requires a more subtle and accurate approach in order to determine the networking requirements a path should meet in order to maximize the user satisfaction, capturing local phenomenon (e.g. effects on delay, jitter and loss at higher frequencies) but also telemetry from upper layers (applications).

Traditionally, a core principle of the Internet has been layer isolation. Such an approach allowed layer dependency (e.g. often referred to as layer violation) to be avoided, at a time where a number of protocols and technologies were developed at each layer. More specifically, the Open Systems Interconnection (OSI) model divides networks into seven networking layers:

1. The Physical (PHY) Layer—the layer representing the physical connections between devices
2. The Data Link Layer—e.g., the layer at which MAC addressing is used
3. The Network Layer—e.g., the layer at which the IP protocol is used
4. The Transport Layer—e.g., the layer at which TCP or UDP
5. The Session Layer—e.g., the layer at which a given session between endpoints is managed
6. The Presentation Layer—e.g., the layer that translates requests from the application layer to the session layer and vice-versa
7. The Application Layer—e.g., the highest layer at which the application itself operates This allowed for the design and deployment of new layers (e.g. PHY, MAC, etc.) independent of each other, and allowing the Internet to scale. Still, with modern applications requiring tight SLAs, a cross-layer approach would be highly beneficial to optimizing the QoE of any given online application.

Further, even with a mechanism that is able to accurately estimate the application experience from the perspective of a user, another challenge still exists with respect to selecting the appropriate network action to improve the experience. Indeed, although the effect of specific actions at a given layer of the networking stack on user experience can be qualitatively evaluated, being able to precisely quantify it is often unknown. For instance, determining that voice quality is low along a highly congested path may be relatively easy. However, determining the correct amount of bandwidth to allocate to the path or the appropriate queue weight for the traffic of the application still remains quite challenging.

According to various embodiments, application experience optimization process 248 may leverage the concept of cognitive networking which focuses on single layers and poorly connect with networking actions, instead of taking a siloed approach where networking systems poorly understand user satisfaction. Cognitive Networks are fully driven by understanding user experience (cognition) using cross-layer telemetry and ground truth user feedback, in order to determine which networking actions can optimize the user experience. To that end, a rich set of telemetry sources are gathered along with labeled user feedback in order to train a machine learning model to predict/forecast the user experience (i.e., the QoE of an online application). Such a holistic approach that is end-to-end across the different network layers is a paradigm shift to how networks have been designed and operated since the early days of the Internet.

As would be appreciated, determining an optimal SD-WAN topology remains challenging. In the absence of sufficient telemetry and in a world where destinations keep moving due to the fast-growing adoption of cloud-hosted SaaS applications, many enterprises have decided to either adopt:

A Hub & Spoke topology where all on-net destinations are sent from Edge to Hub and some off-net (outside of the enterprise) are reached either via the Hub (also referred to as Gateway) or directly using the Internet (e.g., DIA).

Full-mesh topology where all sites are interconnected via a mesh of (IPsec or GRE) tunnels for all on-net destinations or directly using DIA.

Per-region full-mesh topology (more rarely) where all sites in each region are meshed with SD-WAN tunnels.

There are pros and cons to each of the above approaches, mostly trading off routing optimality versus the complexity/ scale. This is due to the fact that since the number of tunnels scales with the square of the number of sites in a full-mesh topology, some enterprises have faced several issues.

Typically, many enterprises, particularly large companies, will have at least several tunnels offering "guaranteed" SLA over pre-established SD-WAN tunnels using a variety of technologies such as MPLS or Internet. Since the setup of such tunnels is not dynamic, these tunnels are often unused, and it has been observed that many tunnels are not carrying any traffic most of the time. This presents the possibility that one enterprise can leverage the unutilized or underutilized tunnel of that of another enterprise in a dynamic manner.

Private SD-WAN Peering

The techniques introduced herein introduce an architecture that allows private enterprises (in contrast with Service Providers) to trade their (available) resources (in the form of SD-WAN tunnels) with each other to extend their respective reach. For example, a company A could propose to a company B to carry A's traffic in locations where A has a strong presence over unused SD-WAN tunnels and vice-versa. In some aspects, the predictive networking techniques above could also make such a service even more appealing, as it would present new opportunities to reroute traffic to avoid poor application QoE. Indeed, in contrast with service providers, who have a deep expertise in SLAs for their customers, the use of predictive networking technologies (reinforcing the level of SLA) could make the ability for an enterprise to act essentially as a service provider by offering their unused capacity to other enterprises that could, in turn, do the same thing thus extending the reach of both companies in their respective regions.

Illustratively, the techniques described herein may be performed by hardware, software, and/or firmware, such as in application experience optimization process 248, which may include computer executable instructions executed by the processor 220 (or independent processor of interfaces 210) to perform functions relating to the techniques described herein.

Specifically, according to various embodiments, a device identifies available resources of a tunnel in a first software defined network. The device provides, based on the available resources, an indication that the tunnel is available to convey traffic sent by a second software defined network. The device receives, based on the indication, a request to convey traffic sent by the second software defined network via the tunnel in the first software defined network. The device configures a peering node in the first software defined network to connect the second software defined network to the tunnel to allow the traffic sent by the second software defined network to be conveyed via the tunnel.

Figure 5:
FIG. 5 illustrates an example architecture for private software defined wide area network (SD-WAN) peering.
Figure 5:
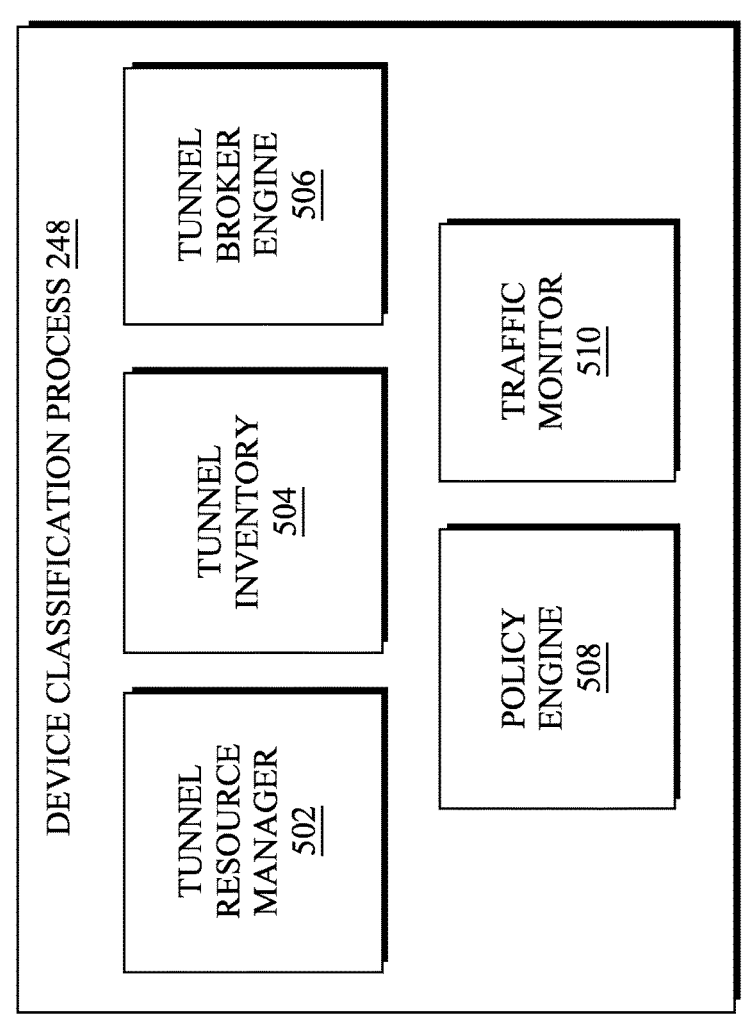

Operationally, FIG. 5 illustrates an example architecture for private SD-WAN peering, according to various embodiments. At the core of architecture 500 is application experience optimization process 248, which may be executed by a controller for a network, a networking device, or another device in communication therewith. For instance, application experience optimization process 248 may be executed by a controller for a network (e.g., SDN controller 408 in FIGS. 4A-4B), a particular networking device in the network (e.g., a router, etc.), another device or service in communication therewith, or any other device in a network. In some embodiments, for instance, application experience optimization process 248 may be used to implement a predictive application aware routing engine, such as predictive application aware routing engine 412, or another supervisory service for the network.

As shown, application experience optimization process 248 may include any or all of the following components: a tunnel resource manager 502, a tunnel inventory 504, tunnel broker engine 506, a policy engine 508, and/or a traffic monitor 510. As would be appreciated, the functionalities of these components may be combined or omitted, as desired (e.g., implemented as part of application experience optimization process 248). In addition, these components may be implemented on a singular device or in a distributed manner, in which case the combination of executing devices can be viewed as their own singular device for purposes of executing application experience optimization process 248.

According to various embodiments, tunnel resource manager 502 may be in charge of managing any or all available tunnels in a (private) network and determining the set of available resources. To that end, tunnel resource manager 502 may operate in conjunction with controllers such as vAnalytics/vManage or the like, to retrieve per-tunnel network performance characteristics such as the following:

Source/Destination,

Type of underlay (e.g., MPLS, public Internet, business Internet, etc.),

Type of applications carried onto the tunnel and load per application,

QoS tagging (e.g., DSCP values for each application carried over the tunnel),

Policy (user configurable): can the tunnel be used by other enterprises or is it reserved for internal use?

Load (in percentage of bandwidth used) along the path of a given tunnel (e.g., distribution of traffic load (potentially per application) such as mean, percentiles, etc.) as a function of time of day, day of the week, etc.

Performance characteristics measured using BFD probes (distribution of delay, loss, jitter along the tunnel), potential performance characteristics when using probing such as ThousandEyes, experience QoE for applications as computed by Cognitive Networks per application along the tunnel.

In various embodiments, tunnel inventory 504 may maintain an inventory of all tunnels available for brokerage with other enterprise networks. Such an inventory may also include the amount of available bandwidth that can be used as part of the brokerage described below. In a first embodiment, tunnel inventory 504 may could maintain (e.g., using tools for capacity estimation) information regarding the total amount of traffic a tunnel could carry without KPI degradation (e.g., the total amount of available bandwidth for a tunnel Ti with no packet drops, without having a jitter exceeding a preconfigured threshold, etc.). In another embodiment, tunnel inventory 504 may express the performance characteristic in terms of QoE (e.g., using cognitive network approaches), without having to specify network layer KPIs.

For the sake of illustration, tunnel inventory 504 could express for tunnel Ti the performance characteristic as the probability for the user to have a good experience for a given application Ai (e.g., Voice/video calls), knowing that the system would consider the other networking segment (from the tunnel destination to voice/video server, etc.). The notion of available bandwidth could also be extended per class of traffic. Indeed, if the enterprise network implements strict QoS policy, then the amount of available resources proposed by the tunnel broker endpoint may be per class of service (CoS), whereby each class is assigned a specific overbooking policy in line with the proposed SLA.

In another embodiment, the tunnel broker endpoint may propose time-based SLA guarantees according to the resources available for a set of source-destination pairs in the network. Using a Machine Learning (ML) algorithm, the system may determine the amount of available capacity under specific constraints (networking KPI, QoE, etc.) as a function of time of day and day of the week.

Using a custom API described further below, the system may offer a service where, for a given application, a specific set of network characteristics (amount of bandwidth, delay, QoE, . . . ) may be available for a given destination according to a specific schedule (time of day, day of the week).

In yet another embodiment, the SLA may also include the ability to support predictive networking. For instance, if the enterprise network supports such a capability, the API may publish at regular interval the probability of SLA violation for a given application over a given forecasting horizon (e.g., the next 24 h, next several weeks, etc.). Such a functionality may be advantageously used by another peering entity to decide whether to use the inter SD-WAN tunnel for a given destination or off-load to another (intra) company tunnel via the Internet, for example.

Figure 6:
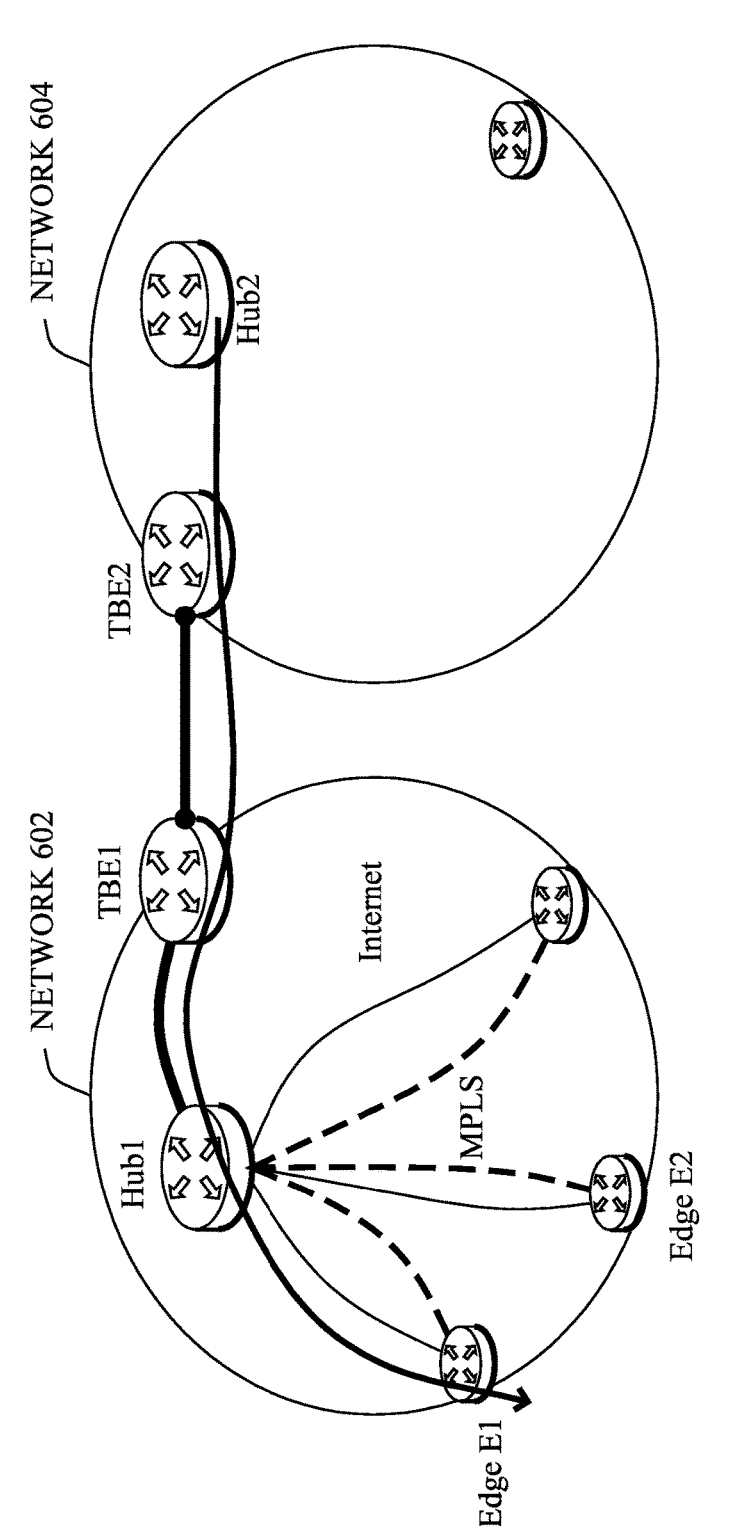
FIG. 6 illustrates an example of private SD-WAN peering between two networks.

FIG. 6 illustrates an example 600 of private SD-WAN peering between two networks, according to various embodiments. As shown, assume that there is a first SD-WAN network 602 and a second SD-WAN network 604, each operated by different enterprises and comprising their own respective sets of routers 606. Here, assume that network 602 uses a hub-and-spoke architecture in which one of its routers 606, denoted Hub 1, is in in communication with a number of edge routers 606, such as E1, E2, etc., via Internet and/or MPLS-based tunnels. In such a case, the techniques herein may allow network 602 to share use of any of these tunnels with another enterprise network, such as network 604. If network 604 does the same, this would allow each enterprise to increase the use of their respective network carrying traffic from other companies, with would be mutually beneficial.

In various embodiments, each of networks 602, 604 may have their own tunnel broker endpoints (TBEs), TBE 1 and TBE 2, respectively, that serve as peering nodes between the two networks. Note that the network operator may decide to host a TBE in different locations according to its points of presence and available capacity, as well. In general, the TBEs may be responsible for indicating each intra-company tunnel proposed for brokerage. For instance, a relay tunnel may be established between Hub 1 and TBE 1, which could allow for traffic to be sent from network 604 via an internal tunnel of network 602 towards a given destination (e.g., via one of the tunnels associated with edge router E1).

Figure 7:
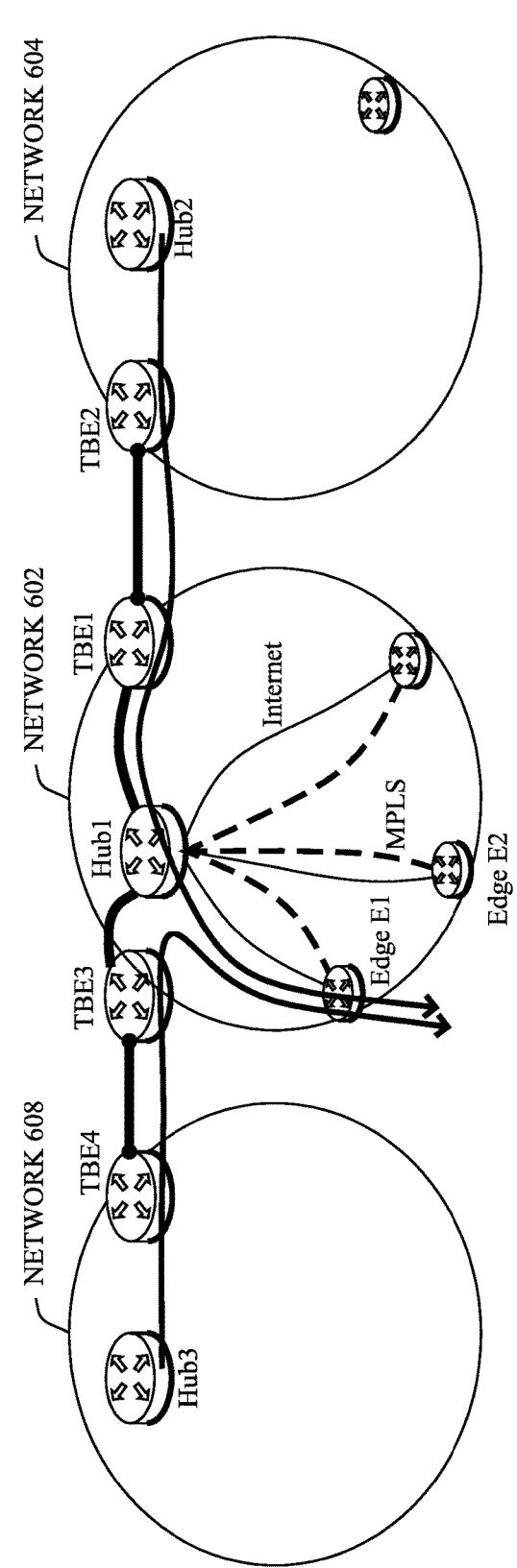
FIG. 7 illustrates an example of private SD-WAN peering between three networks.

Continuing example 600, FIG. 7 illustrates yet another example 700 of SD-WAN peering between three networks. Here, there may be multiple TBEs in any given network, allowing any given enterprise network to convey traffic from any number of other enterprise networks via its internal tunnels. For instance, as shown, assume now that network 602 also includes another TBE, TBE 3, which is in communication with TBE 4 in network 608. In such a case, TBE 3 could likewise indicate that a given tunnel between Hub 1 and E1 is available for use. In turn, if network 608 request to do so, TBE 3 may be configured to then relay traffic sent by network 608 via the internal tunnel of network 602, potentially concurrently with the traffic sent by network 604, as well.

In some embodiments, a TBE may also be responsible for distributing the appropriate security keys (e.g., IPSec) that are used to encrypt the traffic between those the separate enterprise networks (e.g., between TBE 1 and TBE 2, as well as between TBE 3 and TBE 4). This function could be achieved using a control plane protocol such as Viptela's OMP, Cisco's GetVPN, or even DMVPN.

Referring again to FIG. 5, tunnel broker engine 506 may be used to indicate the set of tunnels available for each destination along with their characteristics (delay, etc.), amount of bandwidth available, timing, (committed) SLA, other parameters (e.g., best effort, preemptable, etc.), or other such information regarding the available tunnels. Thus, in some embodiments, tunnel broker engine 506 may operate in conjunction with the TBEs in the network to signal to other networks the list of available tunnels for use. In one embodiment, this indication could take the form of a list of tunnels proposed for brokerage along with their characteristics (e.g., source-destination, list of destination, available bandwidth along with their guarantees, set of DSCP codepoints per CoS, support of SLA (time to reroute, predictive, etc.)) exposed via an application programming interface (API). In other embodiments, such an indication could be sent by the TBE via advertisement messages using BGP extensions.

Policy engine 508 may be responsible for configuring specific control plane policies with respect to the brokering. For purposes of illustration, let the "hosted traffic" refer to the traffic coming from (and destined) to a peered enterprise. For instance, in FIG. 6, from the standpoint of network 602, the hosted traffic would be the traffic coming from network 604 at TBE 1 and destined to each of the remote Edge routers E1, . . . , En in network 602. In one embodiment, all hosted traffic would be received and transmitted with no specific policy. In another embodiment, policy engine 508 may apply policy controls (e.g., using Call Admission Control up to a given amount of traffic in line with the contract (proposed SLA), then dropped or remarked, or using input shaping). In yet 1o another embodiment, a specific class of service could be used for the hosted traffic that is not yet used by network 602. Such CoS could then be queued in separate queues along the path of the traffic flow shown and policy engine 508 may apply per-SLA congestion control, should congestion take place (e.g., such as lower priority queue, random early discard, etc.). In yet another embodiment, hosted traffic may be preemptable in case of local network congestion (e.g., a characteristic published by the TBE).

Traffic monitor 510 may be responsible for monitoring the usage of any brokered tunnel within a network, as well as its performance (e.g., check drops, delays experiences, etc.). For instance, traffic monitor 510 may leverage traffic monitoring tools available from the SD-WAN controller for the hosted traffic (e.g., thanks to Deep Packet Inspection). Using the API exposed by a TBE, a network operator could also publish the network performance metrics for the hosted traffic in their network (such as the delay, loss and jitter) and whether the performances were in line with potential SLA. Alternatively, the network operator may provide the service on a best effort basis while still publishing network performance metrics. In yet another embodiment, network operators may also publish the application QoE for the hosted traffic in place of, or in addition to, the network related KPI.

Traffic monitor 510 may gather performance telemetry for the tunnels proposed for brokerage via regular telemetry supported by SD-WAN (e.g., BFD probes, CXP probes, etc.). In another embodiment, dynamic probing may be triggered for such inter-company tunnels (potentially limited to specific destination on-net and off-net) such as using specific synthetic test using tools such as ThousandEyes.

For billing purposes, traffic monitor 510 may monitor the (hosted) traffic volume per-tunnel or to ensure that it is in line with any agreement between different entities regarding their sharing of resources.

Finally, the techniques herein may also allow remote workers of a company A to establish a VPN connection (GRE over IPSec, SSUTLS, OpenVPN) to the TBE of a company B, and thereby use the corporate SD-WAN of company A to reach the corporate network of B. To do so, the VPN client of the remote worker may contact the TRM of its own company, which would then identify the most appropriate TBE available in the region. In turn, the TRM may send a custom message back to the VPN client, along with the authentication method. The VPN client would then perform a connection to the TBE and use it as its gateway for all or a subset of the traffic. Note that such decisions can also be made per application, such that only specific application traffic is routed through the peering, while the rest either goes over the Internet, either through another VPN tunnel or directly.

Figure 8:
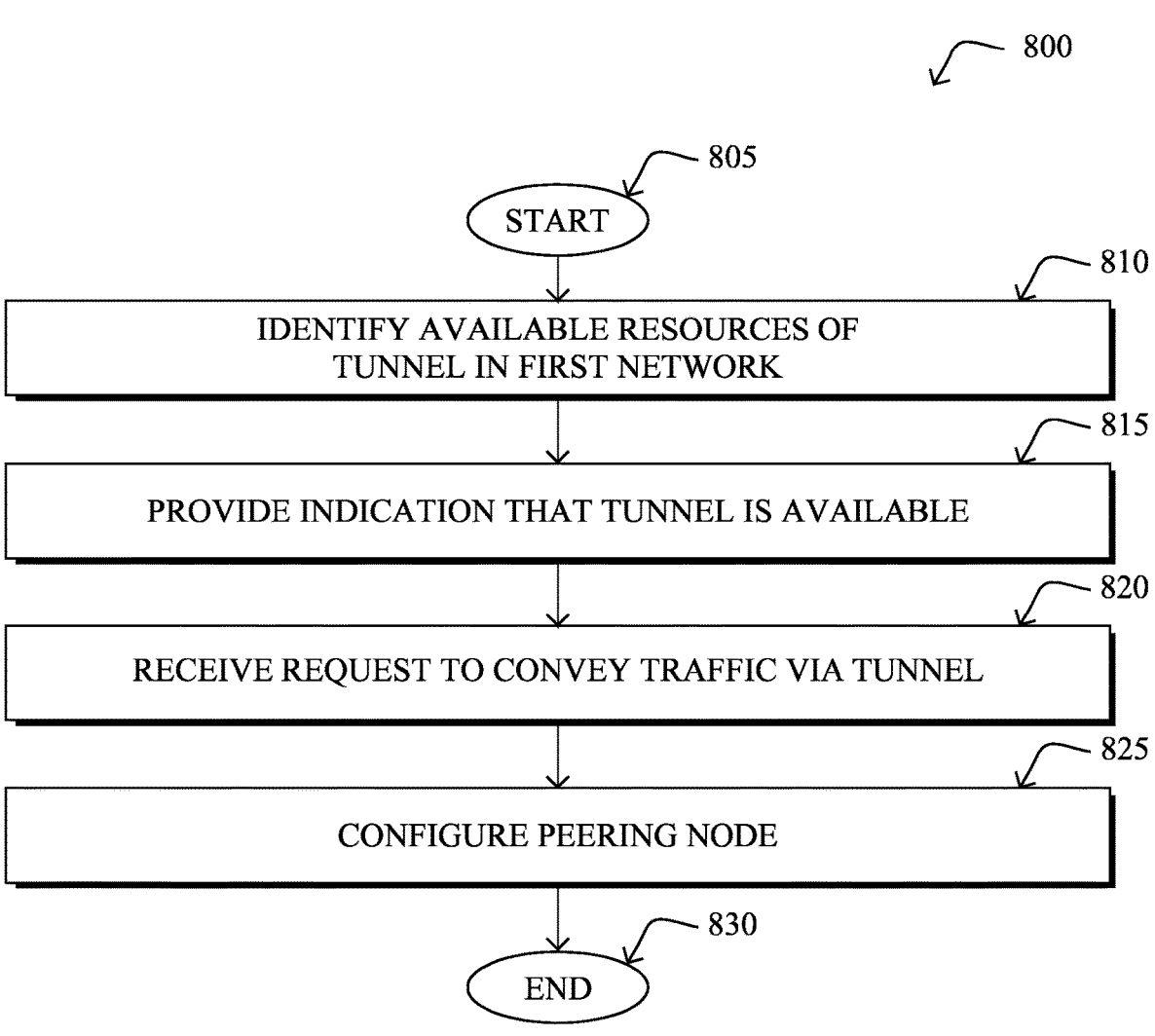
FIG. 8 illustrates an example simplified procedure for private SD-WAN peering.

FIG. 8 illustrates an example simplified procedure (e.g., a method) for private SD-WAN peering, in accordance with one or more embodiments described herein. For example, a non-generic, specifically configured device (e.g., device 200), such as controller for a network (e.g., an SDN controller, a cloud-based device, etc.), an edge router, or other device in communication with a network, may perform procedure 800 by executing stored instructions (e.g., application experience optimization process 248). The procedure 800 may start at step 805, and continues to step 810, where, as described in greater detail above, the device may identify available resources of a tunnel in a first software defined network.

At step 815, as details above, the device may provide, based on the available resources, an indication that the tunnel is available to convey traffic sent by a second software defined network. In one embodiment, the device provides the indication via an application programming interface (API). In another embodiment, the device provides the indication to a router of the second software defined network via a Border Gateway Protocol (BGP) message. In various embodiments, the indication that the tunnel is available indicates at least one of: a source or destination associated with the tunnel, a type of underlay of the tunnel, or quality of service (QoS) tagging associated with the tunnel. In further embodiments, the indication that the tunnel is available indicates a time period during which a service level agreement (SLA) is guaranteed by the tunnel. In some embodiments, the first software defined network and the second software defined network are software defined wide area networks (SD-WANs). In various embodiments, the indication includes a predicted performance of the tunnel (e.g., a probability of an SLA violation, a predicted QoE for a given application, etc.).

At step 820, the device may receive, based on the indication, a request to convey traffic sent by the second software defined network via the tunnel in the first software defined network, as described in greater detail above. In various embodiments, the request is sent by the second software defined network in response to receiving a virtual private network (VPN) connection request from a client.

At step 825, as detailed above, the device may configure a peering node in the first software defined network to connect the second software defined network to the tunnel to allow the traffic sent by the second software defined network to be conveyed via the tunnel. In some embodiments, the device may also an indication of a volume of the traffic sent by the second software defined network via the tunnel in the first software defined network for display. In further embodiments, the device may also configure a relay tunnel in the first software defined network between the peering node and a hub of the first software defined network.

Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for private SD-WAN peering, it is to be understood that various other adaptations and modifications may be made within the spirit and scope of the embodiments herein. For example, while certain embodiments are described herein with respect to using certain models for purposes of predicting application experience metrics, application QoE, disruptions in a network, etc., the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:

identifying, by a device, available resources of an existing tunnel in a first software defined network;

providing, by the device and based on the available resources, an indication that the existing tunnel is available to convey traffic sent by a second software defined network;

receiving, at the device and based on the indication, a request to convey traffic sent by the second software defined network via the existing tunnel in the first software defined network; and configuring, by the device, a peering node in the first software defined network to connect the second software defined network to a first tunnel endpoint of the existing tunnel to cause the traffic sent by the second software defined network to be conveyed via the existing tunnel to a second tunnel endpoint of the existing tunnel that is within the first software defined network.

2. The method as in claim 1, wherein the device provides the indication via an application programming interface (API).

3. The method as in claim 1, wherein the device provides the indication to a router of the second software defined network via a Border Gateway Protocol (BGP) message.

4. The method as in claim 1, further comprising:

providing, by the device, an indication of a volume of the traffic sent by the second software defined network via the existing tunnel in the first software defined network for display.

5. The method as in claim 1, the indication includes a predicted performance of the existing tunnel.

6. The method as in claim 1, wherein the request is sent by the second software defined network in response to receiving a virtual private network (VPN) connection request from a client.

7. The method as in claim 1, wherein the indication that the existing tunnel is available indicates at least one of: a source or destination associated with the existing tunnel, a type of underlay of the existing tunnel, or quality of service (QOS) tagging associated with the existing tunnel.

8. The method as in claim 1, wherein the indication that the existing tunnel is available indicates a time period during which a service level agreement (SLA) is guaranteed by the existing tunnel.

9. The method as in claim 1, further comprising:

configuring a relay tunnel in the first software defined network between the peering node and a hub of the first software defined network.

10. The method as in claim 1, wherein the first software defined network and the second software defined network are software defined wide area networks.

11. An apparatus, comprising:

one or more network interfaces;

a processor coupled to the one or more network interfaces and configured to execute one or more processes; and a memory configured to store a process that is executable by the processor, the process when executed configured to:

identify available resources of an existing tunnel in a first software defined network;

provide, based on the available resources, an indication that the existing tunnel is available to convey traffic sent by a second software defined network;

receive, based on the indication, a request to convey traffic sent by the second software defined network via the existing tunnel in the first software defined network; and configure a peering node in the first software defined network to connect the second software defined network to a first tunnel endpoint of the existing tunnel to cause the traffic sent by the second software defined network to be conveyed via the existing tunnel to a second tunnel endpoint of the existing tunnel that is within the first software defined network.

12. The apparatus as in claim 11, wherein the apparatus provides the indication via an application programming interface (API).

13. The apparatus as in claim 11, wherein the apparatus provides the indication to a router of the second software defined network via a Border Gateway Protocol (BGP) message.

14. The apparatus as in claim 11, wherein the process when executed is further configured to:

provide an indication of a volume of the traffic sent by the second software defined network via the existing tunnel in the first software defined network for display.

15. The apparatus as in claim 11, wherein the indication includes a predicted performance of the existing tunnel.

16. The apparatus as in claim 11, wherein the request is sent by the second software defined network in response to receiving a virtual private network (VPN) connection request from a client.

17. The apparatus as in claim 11, wherein the indication that the existing tunnel is available indicates at least one of: a source or destination associated with the existing tunnel, a type of underlay of the existing tunnel, or quality of service (QOS) tagging associated with the existing tunnel.

18. The apparatus as in claim 11, wherein the indication that the existing tunnel is available indicates a time period during which a service level agreement (SLA) is guaranteed by the existing tunnel.

19. The apparatus as in claim 11, wherein the process when executed is further configured to:

configure a relay tunnel in the first software defined network between the peering node and a hub of the first software defined network.

20. A tangible, non-transitory, computer-readable medium storing program instructions that cause a device to execute a process comprising:

identifying, by the device, available resources of an existing tunnel in a first software defined network;

providing, by the device and based on the available resources, an indication that the existing tunnel is available to convey traffic sent by a second software defined network;

receiving, at the device and based on the indication, a request to convey traffic sent by the second software defined network via the existing tunnel in the first software defined network; and configuring, by the device, a peering node in the first software defined network to connect the second software defined network to a first tunnel endpoint of the existing tunnel to cause the traffic sent by the second software defined network to be conveyed via the existing tunnel to a second tunnel endpoint of the existing tunnel that is within the first software defined network.

* * * * *